United States Patent [19]

Lemelson et al.

[11] Patent Number: 4,653,109
[45] Date of Patent: Mar. 24, 1987

[54] IMAGE ANALYSIS SYSTEM AND METHOD

[76] Inventors: Jerome H. Lemelson, 85 Rector St., Metuchen, N.J. 08840; Christian Grund, 707-L Eagle Heights, Madison, Wis. 53705

[21] Appl. No.: 635,758

[22] Filed: Jul. 30, 1984

[51] Int. Cl.$^4$ ............................ G06K 9/68; G06K 9/62
[52] U.S. Cl. ..................................... 382/34; 382/30; 358/105
[58] Field of Search .................... 382/34, 30; 358/105; 343/5 MM

[56] References Cited

U.S. PATENT DOCUMENTS

| 3,740,466 | 6/1973 | Marshall et al. | 358/105 |
|---|---|---|---|
| 4,219,845 | 8/1980 | Gibbons et al. | 358/105 |
| 4,364,113 | 12/1982 | Sengebusch et al. | 358/105 |
| 4,410,910 | 10/1983 | Andes | 358/105 |
| 4,435,835 | 3/1984 | Sakow et al. | 382/34 |
| 4,458,266 | 7/1984 | Mahoney | 358/105 |

Primary Examiner—Anthony V. Ciarlante

[57] ABSTRACT

A scanning and monitoring system employing automatic image analysis of an image field, object or group of objects over a period of time together with the detection and analysis of one or more other variables, such as generated by sensors sensing changes in or degrees of magnetism, magnetic spin, self radiation, induced radiation, color, temperature, internal structure such as grain or crystalline structure, flow and/or other variables relating to selected objects in an image field under analysis and/or selected portions of such image field. Image information derived from the analysis of reflected light, X-ray, sonic, magnetic spin or nuclear magnetic resonance or other variable or a combination of such variables, is sensed, converted to signals such as analog video signals which are digitized and automatically computer analyzed with time wherein the time variable is recorded by means of codes and used in the automatic analysis. Information is computed defining such variables as changes in position attitude, size, shape, number, distribution, velocity, direction of travel, spin or rotation, color, surface structure, etc. of a selected object or objects in an image field or fields under study or surveillance and such information is recorded and/or used to drive or operate a display, alarm or speech generator, printer or other device such as a control for a motor or operating device which is operable to control or change one or more variables associated with the field being scanned and analyzed.

43 Claims, 8 Drawing Figures

IMAGE ANALYSIS SYSTEM AND METHOD

SUMMARY OF THE INVENTION

This invention relates to a system and method for electronically analyzing images and image fields and automatically detecting changes which occur with time therein such as a shift or shifts in the position of an object or objects; a change or changes in shape of an object; changes in color or light reflectivity of an object, objects or background; appearance or disappearance of an object or objects; an increase or decrease in the number of objects, cells, growths, particles, organisms; variations in the rate and direction of flow of same or fluid or fluids in a duct or ducts or other discrete image phenomena which may be detected by a television camera, discrete sensor or group of sensors.

The automatic detection and measurement of image phenomena by the video read beam scanning of an image field is taught in such U.S. Patents as U.S. Pat. Nos. 3,081,379; 4,118,370; 3,049,588; 2,803,755; 3,621,130; 3,036,291; 3,740,468; 3,049,588; 3,619,494 and 3,621,129. Such patents teach the measurement of static phenomena such as counting particles, measuring areas, lengths and widths, determining the presence of flaws in a surface, determining the presence or lack of a component, determining color or shade, providing an indication of shape for identification, etc. Signals output by the analyzing electronics or computer are indicative of such phenomena which exist at the time of detection or scanning and provide an indication or quantitative measure of such variables at the time of measurement. However, should the image content of the image field being analyzed change with time such as move; grow and/or shrink in size; change color; change shape; effect flow; increase the number of objects, particles, cavities, etc. existing therein or otherwise change, such changing phenomena may not be automatically detected and indicated.

The instant invention employs electro-optical scanning of the same type employed in the prior art wherein the observed image field is scanned a number of times at selected time intervals and the resulting image signals are computer analyzed in such a manner as to detect and provide information signals which are indicative of selected variations in the content(s) of the field scanned or in one or more selected portions of the image field being observed during each subsequent scanning. By detecting variations in such variables as the location or locations of surfaces, edges, flaws, boundaries or other surface or internal phenomena, and performing computer analysis thereof, such variables as the extent and number of flaws, the location or locations of such flaws, the location or locations of objects such as particles of matter, cells, crystals, molecules, holes, pits or flaws, may be automatically determined as may be variations in quantities, rate of flow, direction of movement, enlargement or shrinkage in size, shape changes, color or density changes, etc. may be automatically detected and recorded, displayed or indicated as a printout on a sheet of paper. Such variations or calculated trends involving such variations, may be automatically analyzed by comparison with information which is reproduced from a memory to detect the approach or onset of a particular condition or change before or as it occurs so that corrective action or actions may be automatically or otherwise effected to perform such functions as the optimization of a process, the correction of a fault or faults, the improvement of quality, etc. by changing or otherwise operating on a production tool or group of tools and/or the manner in which such tool or tools is operated or the controlled operation of the transducing means for applying heat, pressure, a chemical or chemicals, radiation or other means to the object or specimen being scanned and analyzed.

Accordingly it is a primary object of the invention to provide a new and improved system and method for the automatic analysis of image fields and the generation of information signals which are indicative of one or more variable phenomena existing and changing in the field scanned and the utilization of such signals to visually or otherwise indicate the type and degrees of such changes.

Another object is to provide a system and method for analyzing image fields over a period of time, detecting and indicating one or more selected changes in the content of the image field scanned.

Another object is to provide a system and method for automatically analyzing image fields over a period of time and detecting and indicating a shift in the location of a discrete portion or object in the field scanned.

Another object is to provide a system and method for analyzing image fields over a period of time and indicating by means of electrical signals a change or changes in the color of a discrete portion of an object or objects in the field scanned.

Another object is to provide a system and method for automatically analyzing image fields by means of a computer and generating signals which are indicative of a change or changes in the velocity of an object or objects in the field scanned over a period of time.

Another object is to provide a system and method for automatically analyzing image fields and generating information which is indicative of a degree or degrees of change in a discrete portion of an object or image in the field scanned, such as a degree of change in shape, size, location, direction of movement, velocity, acceleration, etc.

Another object is to provide a system and method for automatically analyzing image fields and detecting a discrete change with time in an image and automatically indicating the degree of such change and indicating the significance of such change.

Another object is to provide a system and method for automatically analyzing image signals generated in scanning an image field or fields and detecting the onset of a biological condition, such as a disease or malfunction by means of such automatic analysis.

Another object is to provide a system and method for automatically analyzing signals generated over a period of time as a machine or process operates and automatically detecting the onset of one or more conditions requiring attention by detecting and analyzing variations in trend or trends defined by changes in variables in the field scanned over a period of time.

Another object is to provide a system and method for sensing and automatically analyzing variations in radiation given off by an object or variations in a field caused by changes in an object a component or system thereof such as magnetism, temperature, magnetic spin such as nuclear magnetic radiation, induced radiation, X-ray or atomic radiation, sonic radiation or the like and detecting when predetermined changes occur in such radiation or tends in changes in such radiation by the automatic processing and analysis of signals generated or modulated by one or more transducers.

Another object is to provide an automatic image analysis system and method with selective means for indicating predetermined changes in an image field under analysis and an alarm means, such as a warning signal indicator or synthetic speech generator for indicating when a predetermined change or variation in the image field occurs or is being approached.

With the above and such other objects in view as may hereinafter more fully appear, the invention consists of the novel constructions, combinations and arrangements of parts and methods for inspecting and analyzing image fields as will be more fully described and illustrated in the drawings, but it is to be understood that changes, variations and modifications may be resorted to which fall within the scope of the invention as claimed.

DESCRIPTION OF THE DRAWINGS

FIG. 1A illustrates broad details of a computerized terminal 11 forming part of a Computerized Automatic Motion Analysis System 10 which may be referred to hereafter as CAMAS. The terminal 11 includes a housing 11H supporting a data and program entry keyboard 12, a monitor 13 in the form of a cathode ray tube or CRT or a flat panel display 13D such as an LCD display of image information generated thereon by image signals received from one or more remote electro-optical or other sensors or a television camera. A mass storage device 15, such as a magnetic disc, tape transport or electrically erasable solid state memory is provided in a housing 15H supported adjacent the monitor. Also illustrated in FIG. 1A is a support platform 20, such as a table, conveyor belt or the like, shown with an object or assembly 21 thereon defining a portion of the observed field. A source of suitable field illumination is supported within a housing 25 which is connected to receive energizing illumination through a flexible cable 25A which is shown connected to the housing 11H, the latter being connected to a source of electrical energy such as conventional line current. The housing 26 contains a field detector or detection system which will be described hereafter and which is also electrically connected to system components located within housing 11H by means of a cable or multiconductor cord 26A. While housings 25 and 26 are shown physically separated from housing 11H, the three subsystems may also be supported within a single housing or may two-way communicate by means of a suitable shortwave sending and receiving system or light communication system. The illumination source and detector of FIG. 1A may be operable to detect back scattered radiation.

In FIG. 1B, an illumination source 25 is arranged on the other side of an object 21 on conveyor or movable platform 20, to transmit illuminating or detection radiation directly to a detector 26D located in the housing on the other side of the conveyor.

FIG. 2 illustrates details of components of a typical electronic control system 10E which is supported within the housing 11H at the computer terminal 11 or is operately connected thereto. System 10E is operable to effect the automatic computerized motion analysis of an object or objects in an image field, which move into and out of an image field such as on a conveyor being scanned by one or more television cameras or an image field or a portion of such image field which is changing in content as the result of one or more flows of material or other form of image generating means which includes a portion or portions thereof in motion. An operator of system 10 may also effect as measurement mode or initiate a particular cycle of measurement by selecting one of a number of recorded or memory contained programs from a plurality of pre-programmed operating modes which are provided in a program memory 30, such as a read-only memory or ROM. Such selection may be effected by signals generated manually or automatically and applied to or by a microprocessor or microcomputer 31 which may be addressed or controlled in its operation by the selective operation of a plurality of manually operated keys of a digitally encoded keyboard 12 or by other means. Keyboard 12 may also be used to select previously stored operation programs from a mass storage memory 15 wherein the microprocessor 31 is utilized together with an input-output (I/O) buffer 32. The transferred program or programs of information may be locally stored in a portion of a programmable memory, such as a RAM 33 or random access memory, for subsequent use by the microprocessor during the measurement operation. The encoded keyboard 12 may also be used for accessing direct data from the mass memory, 15 or an auxiliary memory or to effect the programmed entry of data into the program memory 30. Selected keys of the keyboard as well as a manually operated device such as a joystick 34, mouse or other suitable means may be employed to control the location of a cursor or indicator on the display screen of a display 13 such as a television receiver or cathode ray tube. Analog signals which are indicative of a selected coordinate location of the display screen, which may be indicated by means of a cursor, crosshair image or other form of image on the screen, are output by the control 34 to an analog-to-digital converter 35, the output of which is applied to microprocessor 31 which records the coordinate locating signals which define the selected location or center of the crosshair image, in a display screen mapped memory 36. As such memory is sequentially addressed by signals from the microprocessor 31, bytes which are indicative of luminance and/or color to be displayed at the corresponding mapped position on the visual display 13, are presented to the output bus 36a of memory 35 and are thereafter conducted back to the microprocessor 31 for further processing as will be described, which processing includes the application of such signals to a digital to analog converter 37 which is connected to operate and control the display 13 through a video mixer 38.

Figure 1:
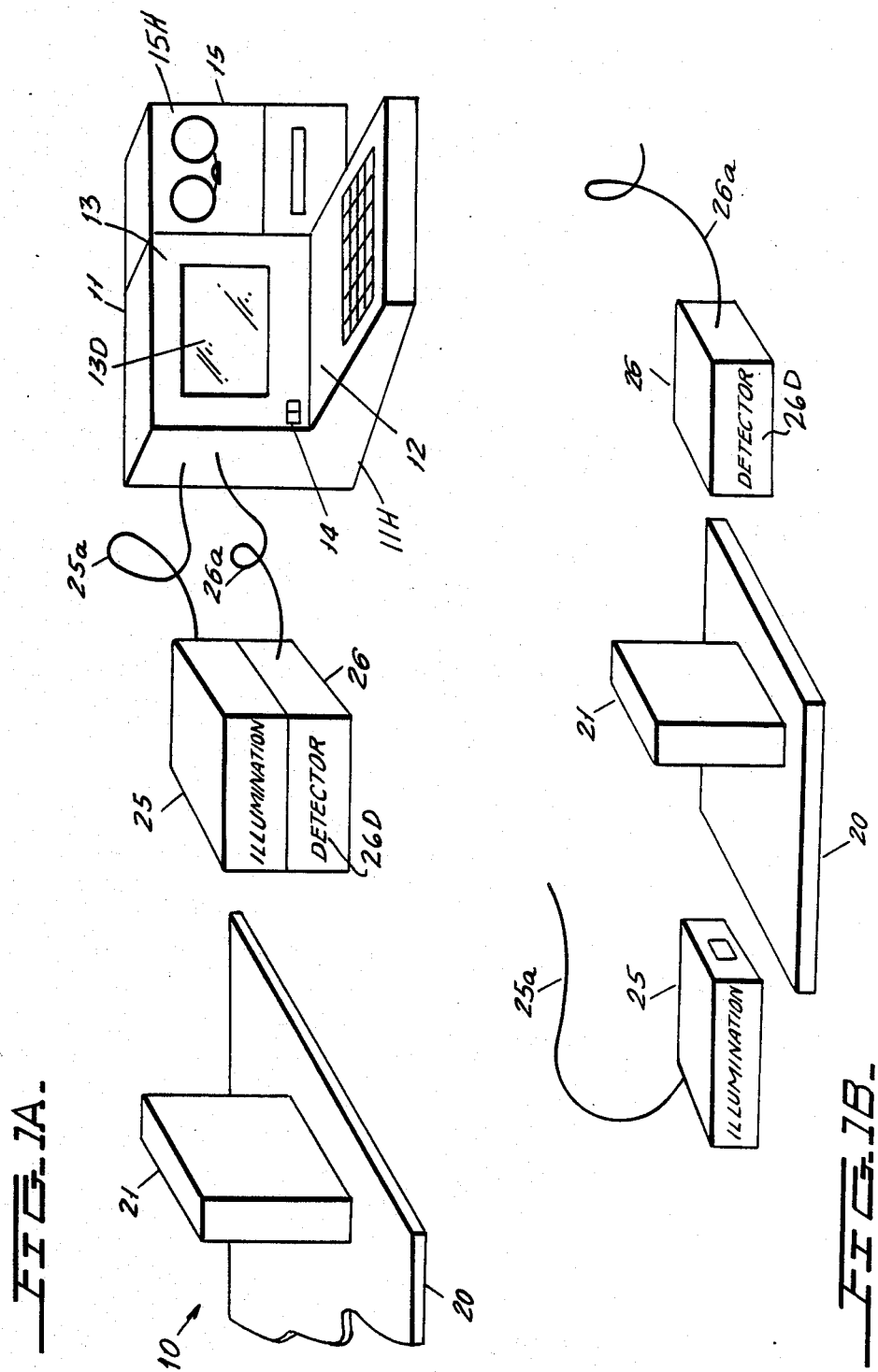
FIG. 1A is an isometric view showing subsystem components of a computer controlled automatic image analysis system for detecting changes in an image field and employing reflected light electronic detection means.
FIG. 1B is an isometric view of components and subsystems of the system shown in FIG. 1 arranged for analyzing changes in direct light after it has passed through and/or past the object or field under analysis.

Character signals generated by the selective operation of the keys of the keyboard 12 may also be applied to generate selected characters on display 13. Keyboard 12 may also be utilized to input instruction commands to the microprocessor 31 for operating the image analyzing system in the manner described herein. Such command signals may be stored by means of microprocessor 31, in a character buffer memory 39 which may comprise a RAM and which operates to input its stored information to the video mixer 38 through character generating electronic circuitry 40. Character byte data stored in memory 39, is controllably reproduced therefrom and applied to control character generator 40, the output of which is applied through video mixer 38 to generate suitable characters at selected locations of the display screen of the display 13.

Timing and synchronization signals for system 10E are generated by an oscillator 41 which has a stable, accurate feedback circuit means 42 such as a quartz crystal signal generator. Raster scan synchronization is effected and controlled by microprocessor 31 which controls horizontal and vertical scan counters 43 and 44 and by means of the signals output by oscillator 41 which are applied to and scaled by electronic dividers 45 and 46. The outputs of counters 43 and 44 comprise digital signals which are representative of the total accumulated number of timing pulses received from divider 45 plus the preset counter offsets. The outputs of the counters nonotonically increase or decrease until the entire program scan sequence has been completed at which time the counters reset and begin to cycle again. The outputs of counters 43 and 44 are converted to analog signals suitable to control horizontal and vertical raster scanning, by means of digital-to-analog converters 47 and 48. The horizontal and vertical digital scan signals output by counters 41 and 42 are also passed through wires or conductors 43a and 44a to a field illumination subsystem 100 and conductors 43 and 44 of a flexible cable extending to a field detection subsystem 150.

The field illumination subsystem 100 may also contain additional synchronization input signals directly from oscillator 41 through a conductor 41b of a flexible cable.

Digital signals which are output from field detection system 150 and are representative of illumination intensity or color signals derived from the scanned field, are conducted through conductors 31a of the flexible cable 26a to microprocessor 31 and constitute input defining information caused by variations in direct or reflected light from the scanned field and received by the input to the test and analyzing system 10E.

Figure 2:
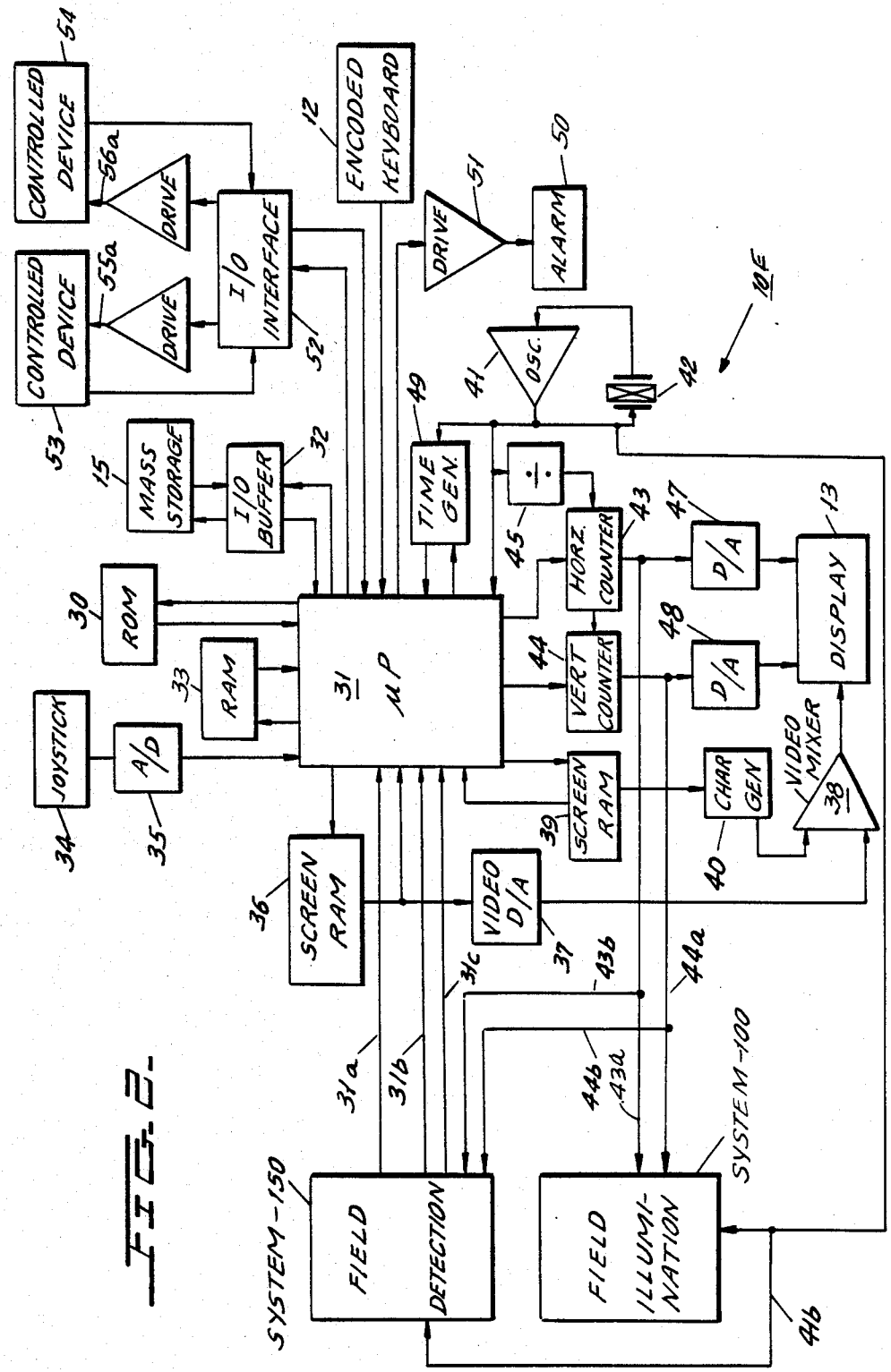
FIG. 2 is a schematic diagram of components and subsystems of an automatic image field analysis system employing a microprocessor or microcomputer to control the system.

Also illustrated in FIG. 2 is a digital time generator 49, the time base of which is derived from the output of oscillator 41. The output of oscillator 41 is a time representative digital code which is input to microprocessor 31 for use thereby in recording time indicating code signals. A warning device 50 such as sirene or light, is provided and is driven by signals from microprocessor 31 applied to an alarm driver 51 connected thereto.

Also provided and driven by microprocessor 31, is an input-output control interface 52 which may be used to drive one or more external devices, denoted 53 and 54, which may comprise conventional or stepping motors for moving one or more mirrors, lenses or a support for the image field itself. Such external devices may also include one or more beam generating and directing devices for radiant energy such as laser light, or other form of radiation or one or more motors employed to position such devices in response to the operation of respective drivers 55 and 56 which receive signals from the input-output interface 52.

Figure 3:
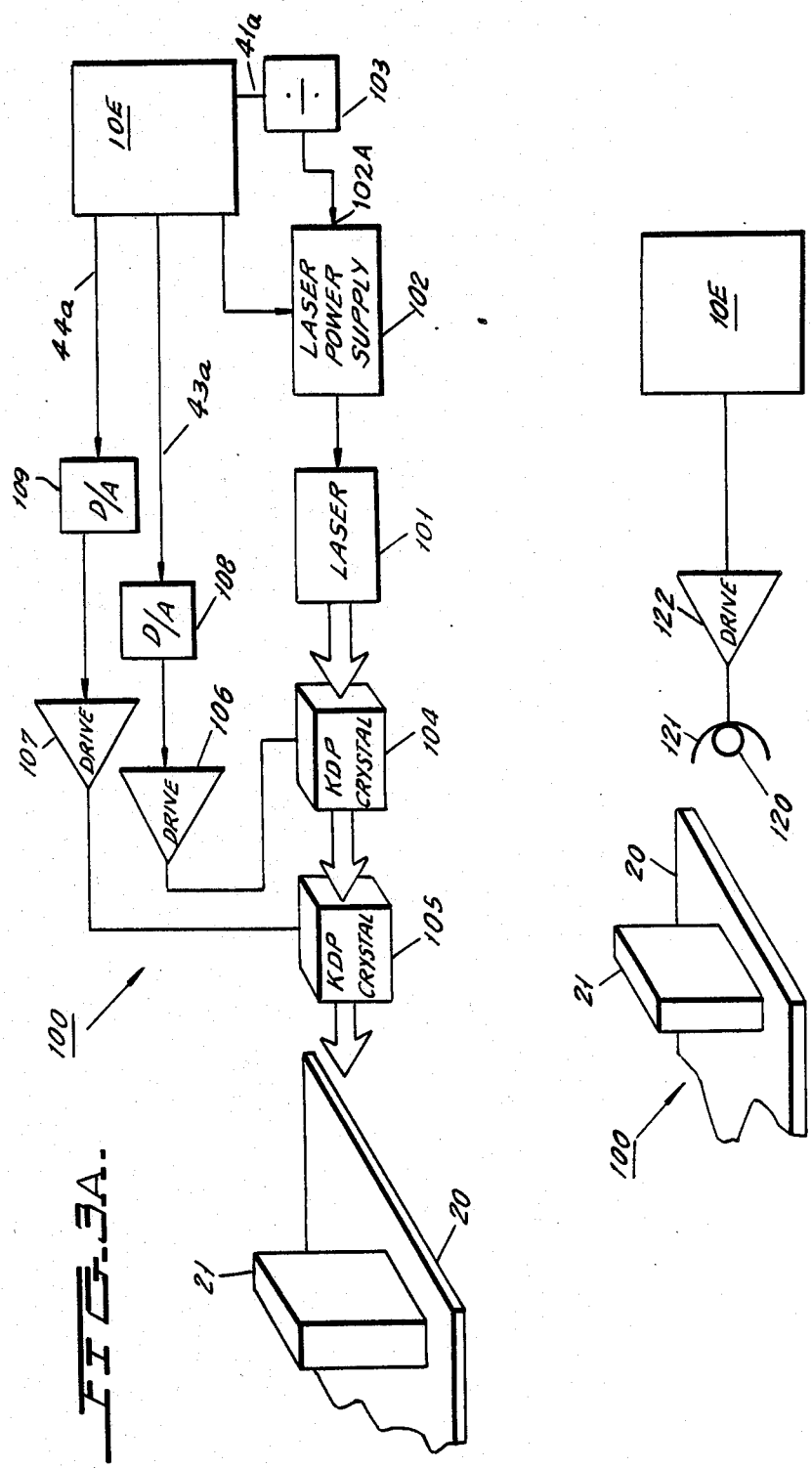
FIG. 3A is a schematic diagram and isometric view of components of the automatic image analysis system field illumination subsystem.
FIG. 3B is a schematic diagram of another type of field illumination subsystem for use in the automatic image analysis system shown in FIGS. 1 and 2.

In FIG. 3A is shown a typical construction of field illumination system 100, wherein the illumination source is applied as a beam or other form of radiation which is scanned across the field or area under observation. A typical illumination source may comprise a laser 101 which may be pulsed or continuously operated by means of a semiconductor, gas, dye or other form of lasing medium and input thereto. Input power for pumping the laser is derived from a power supply 102. If a pulsed laser is employed, precise synchronization of the pulsing thereof may be effected by means of timing signals conducted from the oscillator 41 of system 10E and applied to a divider 103 through conductor 41a of the flexible cable 25a. Divider 103 scales the timing signals to appropriately operate the laser. The divider timing signals are conducted to a trigger input 102A for the laser power supply 102 and are employed to cause triggering of the supply current pulse. Supply power may be controlled by means of control signals applied through control cable 25a.

Monochromatic light output by laser 101 is caused to spatially scan a field and is so controlled by means of two electro-optically active crystals 104 and 105 such as double prisms, which are made of suitable material such as $KH_2PO_4$ KDP having appropriately attached electrodes in accordance with the construction and operation of similar devices which are known in the art. Scanning crystal 104 is so operable that a varying potential generated across such crystal will effect the internal indexing of refraction changes in a plane such that monochromatic light transmitted therethrough will be refracted at corresponding varying angles to the incident ray which is normal in a horizontal plane. Scanning crystal 105 may operate in a similar manner but its electro-optic axis is arranged so as to effect ray deflection in a vertical plane. Control electric potentials for crystals 104 and 105 are respectively derived from a pair of drivers 106 and 107. The outputs of drivers 106 and 107 are proportionately controlled by outputs of respective digital-to-analog converters 108 and 109 which obtain inputs from the digital scanning outputs of counters 43 and 44. There is thus provided a synchronized scanning illumination sweep of the field when laser 101 is so controlled.

In FIG. 3B is shown details of an alternate illumination system 100A which may be utilized to generate generally fixed field illumination used in conjunction with or in lieu of the means described above relating to FIG. 3A. A light source 120, such as an incandescent, fluorescent or other source of light, is provided with a supporting reflector 121 which serves to direct light output from source 20 to create more or less even illumination of the image field under observation. Light source 20 is powered by a lamp driver circuit 122 which may be turned on or off or changed in driving intensity in response to control signals generated by system 10e and carried through conductor 56a.

Figure 4:
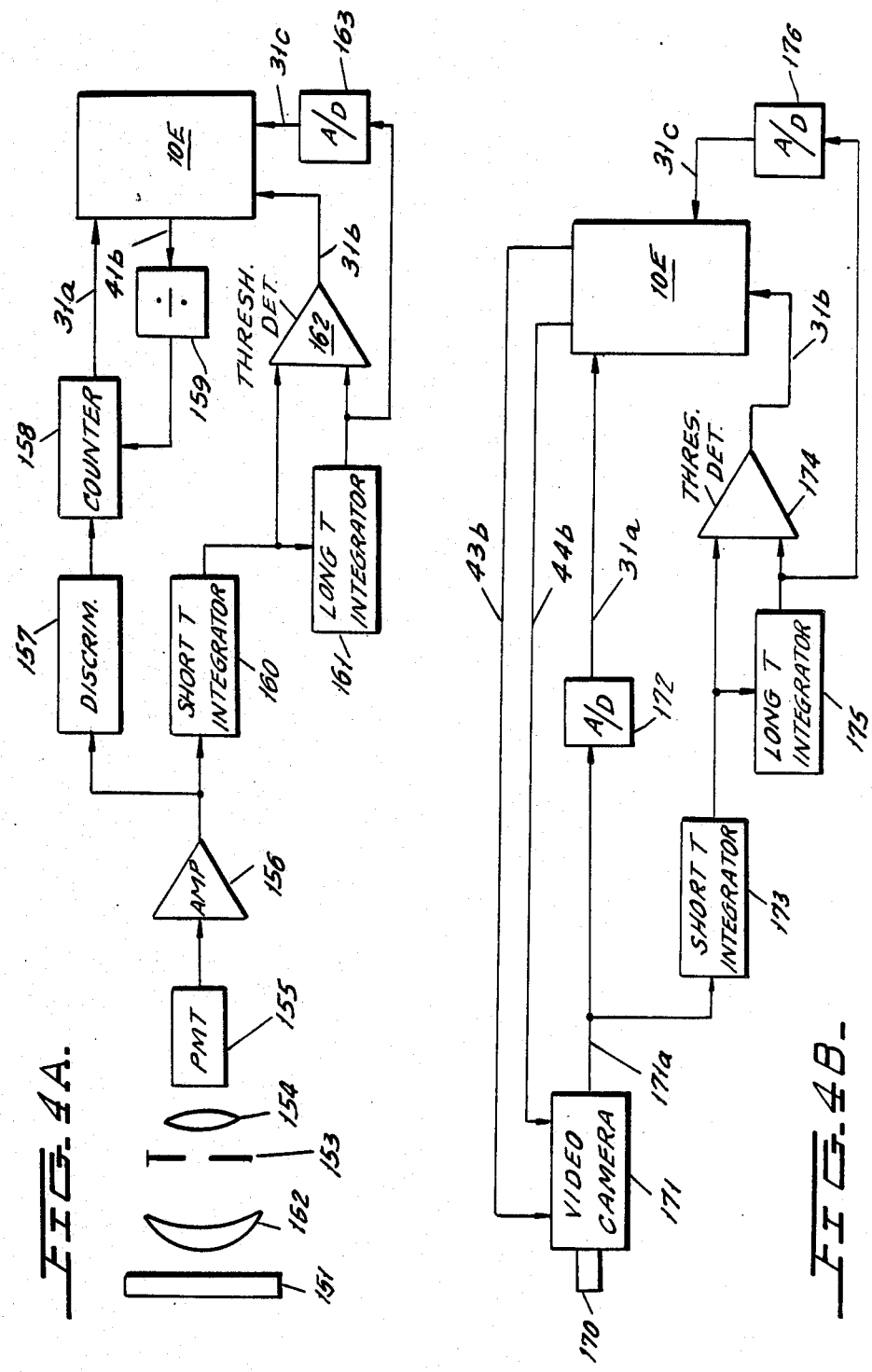
FIG. 4A is a schematic diagram of a fixed field detection subsystem applicable to the system of FIG. 2.
FIG. 4B is a schematic diagram showing further details of the field detection subsystem of FIG. 2.

In FIG. 4A is shown typical details of a fixed field detection system denoted 150. Light scattered from the field under observation and generated, for example, by the means illustrated in FIG. 3A, impinges upon a lens 152 through a narrow interference filter 151, the center wave length of which coincides with that of the illuminating laser. Such light is focused on a field stop 153 which operates to set the size and shape of the observed field. Light passing through field stop 153 is focused by means of a lens 154 on the photocathode of a photomultiplier 155 or other photosensitive device or detector which is suitable for photon counting. Pulse signals output from the photomultiplier 155, which are indicative of the total number of photons entering the device 155 from the observed field, are amplified by means of a fast amplifier 156, the output of which is passed to a discriminator 157 which outputs a pulse of fixed width and amplitude for each input photon generated pulse signal which is above a preset threshold level. Such pulse signals are then counted and the counts, which are proportional to a detected light level, are accumulated in a counter 158. The output of counter 158 is generated in digital form and is conducted therefrom through cable conductor 31A to the electronics of system 10. Counter 158 is reset at an appropriate time to allow it to count signals generated by the next field illuminated by the pulsed laser wherein such resetting is effected by means of signals derived from the timing oscillator 41 of system 10E, which signals are appropriately prescaled to match the laser pulse repetition rate by means of a divider 159.

The automatic detection of discontinuities in the observed field, such as caused when the scanning beam scans across the edge of an object, are indicated by sudden changes in the number of pulses generated per unit of time on the output of the photomultiplier 155. Signals output by the photomultiplier 155 are integrated over a short time with respect to the scan period, or in the order of twice the laser pulse period if a pulse laser is used for illumination, by means of a pulse integrator 160, the output of which constitutes an analog peak signal which is proportional to the photons received per unit of time. Such peak signal is itself integrated over a period of time in the order of the total field scan time by integrator 161, the output of which is representative of the entire field average illumination level. A long integration time signal generated by integrator 161 is input to the threshold determining input of a threshhold detector 162, such as a fast comparator, Schmitt trigger-multivibrator or the like which has sufficient hysteresis characteristics. A short time integrated signal generated by integrator 160 is compared in threshhold detector 162 to the background level signal received from integrator 161 and, when such background level is exceeded by the fast signal output, threshhold detector 162 signals such condition to microprocessor 31.

Actual field average background level from integrator 161 is also converted to a representative digital code signal by means of an analog to digital converter 163, the output of which is conducted through a conductor 31c of the cable to the microprocessor 31 for use in effecting measurement and indicating functions.

In FIG. 4B is illustrated details of field detection system 150 employed in FIG. 2. Light which is scattered from the observed field is focused by means of a lens system 170 into a high resolution television camera 171 such as a Vidicon, a charge coupled or CCD camera, the beam of which is caused to be electronically scanned across the image of the observed field, in the vertical by signals conducted through cable 44b and in the horizontal by signals conducted through cable 43b. The output 171A of camera 171 comprises signals which vary with variations in light received from the scan field, which signals are converted to digital form by an analog-to-digital converter 172 which passes such signals to the microprocessor 31 through a conductor 31A.

Detection of the edge of an object is effected in system 150 in a manner similar to that described in the description of FIG. 4A. Video intensity signals are generated on conductor 171A and are integrated over a short period of time, with respect to the time it takes to scan the entire field, by an integrator 173, the output of which is connected to the input of a threshhold detector 174 and also to a long time constant integrator 175. The output of integrator 175 is at a dc level representative of the average field illumination which is sensed and is transmitted to the threshhold detector 174 which utilizes same as a reference signal. The output of detector 174 becomes active whenever the signal received by detector 174 from integrator 173 exceeds the signal input from integrator 175 by a preset amount which is such as to allow for noise immunity. Detector 173 is connected, by means of conductor 31b to system 10E. The signal output by integrator 175 is indicative of the average field level and is converted to a representative digital code signal by an analog-to-digital converter 176 which is connected to the microprocessor 31 and system 10E through conductor 31c.

As a replacement for or an addition to the laser scanning means 101 illustrated in FIG. 3A for scanning the image field under inspection or analysis, other radiation generating means may also be provided to effect such automatic scanning and analysis. As an example, if the device or image field being inspected is provided in a vacuum chamber, an electron gun or the like may be employed to scan the object or field under observation whereon a detector, such as a micro channel plate type of electron multiplier may be employed for image intensification. Alternately, a simple electron counting detector may also be employed to detect electron radiation reflected from or passing through an object or field.

An X-ray generator may also be employed per se or in cooperation with other forms of radiation generating and detecting means for scanning a changing image field or moving object. In such examples, electromagnetic and/or electrostatic focusing fields may be employed in lieu of lenses, to properly focus radiation against and through the object or field under observation.

In the example illustrated in FIGS. 3A and 3B, a fixed or stationary table 20 supporting a fixed object is provided within a scanning field although the fixed table may be replaced by a moving conveyor or similar device which may be controlled in its motion through the scanning field. The object 21 itself may be in motion and may include one or more living organisms or cells movable through a field of observation or may be electromechanically or otherwise moved through such field by the application, for example, of suitable energy, such as a moving magnetic field, or the movement of a fluid containing such object or objects to be analyzed. Such moving conveyor or other device is preferably controlled in its operation and movement by means of signals generated by microprocessor 31 through an external device control means controlled, for example, by means of a driver similar to driver 56 of FIG. 2, which may comprise one of a plurality of such drivers connected to the input-output interface 52 to effect multi-access movement or other form of movement of the object or objects in the scanning field or the scanning device with respect to a field which is greater than the scanning field.

Figure 5:
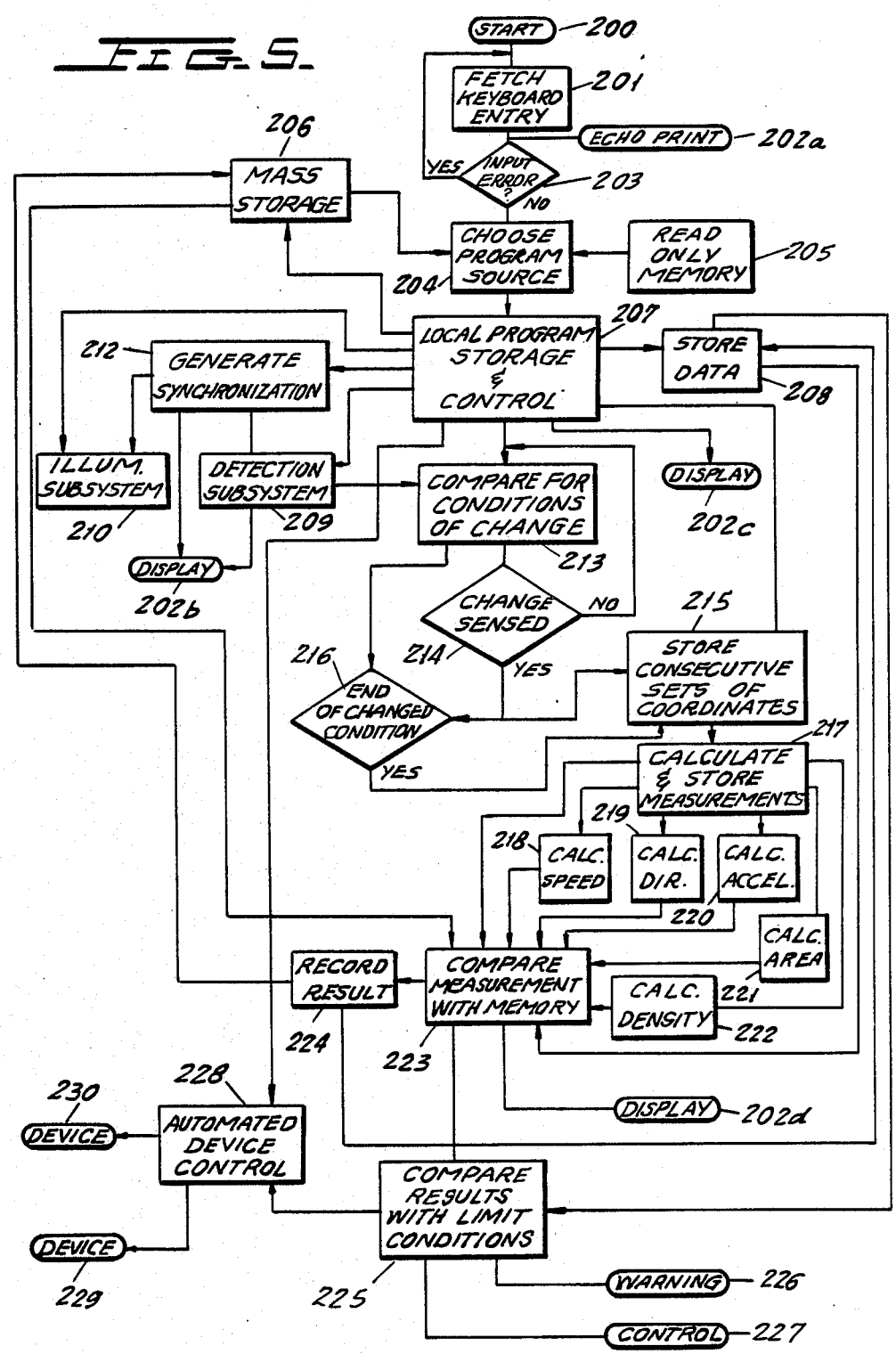
FIG. 5 is a logic flow chart or diagram of the computer controlled automatic image analysis system defining the instant invention.

In FIG. 5 is shown a logic flow chart relating to the described computerized automatic motion analysis system. System operation is initiated in the start phase 200 with power up. Keyboard entry initiates at 201 which is echo printed at 202 for verification. If an input error occurs, such error is detected at 203 and program control returns to 201. Input at 201 may consist of direct program and/or data entry or selective programming by the selected reproduction of preprogrammed instructions and/or other data. When the no-error input condition is indicated at 203, the appropriate program or data source is switched on line at 204. Data choices are made from one or more of the preprogrammed memory 205, mass storage device 206 or direct keyboard entry from 203. Local chosen program storage and control is handled at 207 which is employed to synchronize program control functions and effect the orderly flow of data. Block 207 accounts for fetching and routing whatever data is needed for system operation and loading such data into temporary data storage 208. Such data may consist of digitized images which may be compared to the current observations, standard or expected object coordinates, object or image shape or shapes, color or colors, size or sizes, velocity or velocities, acceleration or accelerations, densities, etc. Block 207 also accounts for such rudimentary functions as maintenance of program and stack pointers, organization of synchronization and/or control signals for controlling the operation of the detection subsystem 209, the illumination subsystem 210 and display 202, which is indicated as a plurality of displays 202a–202d. Synchronization control is effected by software accessible generating means 212. Block 207 may also contain means for effecting error or other logic condition detection which is displayed by means of display 202c.

The output of detection subsystem 209 is compared to base or preset values which are defined by program controller 207, such comparison being made as indicated by block 213. Until the presets or predetermined conditions of brightness, position, color, contrast, etc. or predetermined variations thereof are met, program control is returned to the input to block 213 when such is sensed by sensing means defined by block 214. When such conditions are met, the current coordinates of the scanned image are recorded by the storage means of block 215 and are available for immediate reference and comparison with comparison coordinates recorded by means associated with block 215 when the end of the sensed condition is sensed and determined by decision block 216. Such recorded coordinates are then converted to coded signals defining values of such variables as length, width and angle measurements and are then stored by means associated with block 217. Consecutively stored measurements are then used to calculate such variables as velocity or speed by means associated with block 218; direction by means associated with block 219; acceleration by means associated with block 220; object area or areas as defined in block 221; densities such as the percentage of viewed area or image field containing by particles; particles or patches of a particular shape, color or group of colors, etc. as determined by block 222. The outputs of blocks 217–222 are compared by means associated with block 223 with signals received from pre-loaded or recorded data store system 208. The results of such comparison, which may indicate one or more variables sought to determine, may comprise the identification or absence of a particular shape or object, the deviation of the shape of the object from a standard or expected shape or size, identification or deviation of a number of similarly shaped objects in the field under analysis, their color, color variations, etc., signal data which is indicative of variations in the shape or shapes of objects under observation from a standard or standard shapes, signal indications of growth or shrinkage of an object or objects under observation, signal indications of color changes per se or with time, signal indications of variations in radiation emitted by an object or objects in the field scanned, signal indications of direction or directions of movements of an object or objects, etc. The immediate results of such measurements and comparisons may be displayed by a display forming part of block 202d and may also be employed to compare such results with so-called limit or standard conditions as indicated by signals stored in memory 208 defining the quantitative values of one or more predetermined parameters. Further comparisons may be effected by means associated with block 225 which may be utilized to provide signals which may be used to control the display, highlight or warn of certain degrees of change, such as by triggering a warning device 226 or other means 227 for directly controlling the process under observation by predeterminately controlling one or more motors, valves, radiation generating means, etc. either in direct response to control signals which are generated by the analyzing computer or in a closed loop control system employing feedback signals to assure that commanded operation thereof is effected.

The results of analysis or comparisons made in block 225 may also be employed to trigger other external process control or means for affecting the process being observed in accordance with control instructions generated by block 207. Control is effected by signals generated on the output of the devices associated with block 228 which are applied to one or more servo, switch or signal controlled devices such as analog or stepping motors for controlling object movement, the movement of one or more fluids through valves, the operation of illumination or detection devices, etc.

The system described may be employed either to analyze a two-dimensional image or image field or a three-dimensional system by the proper inclusion of suitable servo devices or motors which physically control the movement of the devices and subsystems described such as the illumination subsystem, the radiation detector or a plurality of such detectors, etc., to permit the receipt of radiation from a variety of different angles with respect to the object, image or images or the image field. Such angularly dependent images may be interpreted as a plurality of cross sectional slices or views generated by computer analysis similar to so-called CAT scans. In such a three dimensional system, variables of the type described above, which the object or objects under observation may undergo during an observation period or cycle, may be measured and expressed in terms of three-dimensional coordinates, movements and density variations and utilized as described to display or otherwise present data defining such three-dimensional object variations with time.

Holographic means may also be employed to improve or extend the application of the computerized automatic motion analysis system described above wherein digitally represented holographic defraction gratings, are employed which define the Fourier transforms of the image space being scanned which, when sensed by suitable electro-optical scanning and sensing means, provide digital signal indications of the locations of select portions of the object or objects being scanned, which signals may be electronically compared with signals generated from a memory and processed to automatically provide digital signal indications of such variables as size, shape, field position, number of particles, color, variations in density, direction and velocity of movement, acceleration and deceleration, etc. Such a system involves extremely high resolution electro-optics and a monochromatic, coherent source of light such as a laser or a group of lasers.

For the purpose of simplifying the drawings, power supplies and the like have been eliminated. It is therefore assumed that the correct power supplies are provided on the correct sides of all electrical devices and subsystems for suitably operating the systems and devices described, when a suitable manual switch or a group of such switches are provided in a closed condition.

Modifications of the described invention are noted as follows:

1. The controlled devices 53 and 54 of FIG. 2 or the automated device control means 228 defined in FIG. 5 may comprise a motor or motors for single or multi axis moving and/or pivoting the scanning sensor (television camer or laser) or controllably deflection controlling the scanning read-beam thereof to cause same to shift its scanning field or to scan one or more new fields in its realm of operation so as to automatically observe and scan a new area or volume associated with the field or volume just scanned in which a detected change has just occurred to determine, by automatic image analysis of the type described above, the content thereof and/or changing phenomena occurring therein. Such information relating to the new field scanned may be displayed, recorded and/or annunciated to a person monitoring a process or changing image event or may be used to effect further control of one or more automatically controlled devices. Similarly, signals generated as a result of scanning and analyzing the image content or changing content in one image field may be employed to selectively deflection controlling one or more scanning read-beams such as the read-beam of a television camera or laser scanner of a scanning and automatic image phenomena detection system to cause the beam or beams thereof to increase or decrease the field scanned or to scan a selected portion of the field scanned for sensing a particular image phenomenon and providing signals which may be computer analyzed to more precisely determine or indicate a select condition in the field scanned.

2. The controlled devices 53,54 may comprise means for correcting or controlling a changing or changed condition which is sensed and indicated as described above. For example, it may comprise a laser or other radiation beam generating means which is automatically controlled in its operation by signals generated by the computer, to generate and dirrect its beam against a flaw, particle, microorganism, leision, tumor, surface crack, burr, malformation or other irregularity which has been detected and monitored as described, or a plurality of same and is operated to correct or eliminate same by intense beam radiation operable to erode, burn, vaporize or melt the irregularity or material adjacent thereto in an automatic and efficient manner.

3. The controlled devices 53,54 may comprise electrically operated or controlled means for effecting or controlling an improved or additional inspection or diagnostic operation with respect to an object or living being in the image field being scanned. For example, devices 53,54 may comprise motor means for driving and positioning a television camera, inspection laser, source of X-rays or other radiation and/or focusing the beam thereof to inspect a select area or location defined and indicated by the signals generated by the changing events image analyzing computer. Such signal controlled devices may also comprise means for generating or controlling the generation of penetrating radiation such as X-rays, magnetic field (NMR) radiation or neutron radiation and employing same for internal inspection or to activate or control a device or chemical within a living being for treatment and/or diagnostic purposes.

4. The controlled device(s) 53,54 may comprise an electrically operated motor or electrode(s) employed to selectively and controllably dispense one or more chemicals or medications in accordance with the type and/or degree of image field change detected as described. For example, an electrically operated valve means and/or pump may be controlled by or comprise the device(s) 53,54 for the controlled flow or dispensing of a medication, chemical or process material from a supply thereof, such as a reservoir, implant or other source.

5. The controlled device(s) 53,54 may comprise one or more motors or control means for a recorder adapted to record signals output by the computer and defining the characteristics and quantitative value(s) of the change or changes so detected. Such device(s) may also comprise one or more wrning annunciators such as speech generators for indicating the changed or changing event by generating sounds of words of speech.

We claim:

1. A method of analyzing changing events comprising:
   scanning a first image field during a first interval of time with a sensing means and generating a first video signal on the output of said first sensing means,
   computer processing and analyzing said first video signal and generating first code signals indicative of characteristics of the image content of at least a portion of said image field scanned,
   recording said first code signals in a first memory,
   scanning said first image field a second time with said sensing means and during an interval which occurs after the completion of said first scanning operation and after a change has taken place in the contents of the image field scanned, and generating a second video signal on an output of said sensing means,
   computer processing and analyzing said second video signal and generating a second code signal,
   recording said second code signal in a second memory,
   reproducing said first and second recordings of said first and second code signals from said first and second memories, computer analyzing said first and second code signals and automatically detecting differences therein, and generating a third code signal defining information about said change in said image field, recording said third code signal, thereafter repeatedly scanning said image field a number of times and repeating the procedure of computer analyzing each video signal generated, and generating further code signals defining further changes in the content of the image field occurring between each of said scannings, recording said latter code signals as they are generated and further computer analyzing same in a manner to detect changes in the content of the image field over an extended period of time and determining a trend in the change in image content of said image field.

2. A method in accordance with claim 1 wherein the trend which is automatically detected is a change in the velocity of flow of a fluid, such as a body of water, in the image field scanned.

3. A method in accordance with claim 2 wherein the trend which is automatically detected is the direction of flow of a fluid in the image field scanned, further including generating signals indicating such trend and updating the image information generated and the analysis of the image field scanned.

4. A method in accordance with claim 1 wherein the trend which is automatically detected is a change in color of a portion of the image field scanned.

5. A method in accordance with claim 1 wherein the change in the image field scanned which is automatically detected as the result of such computer analysis, is the content of a select portion of the field scanned by said first field scanning means.

6. A method in accordance with claim 1 wherein the detected change in content which is detected, is an increase in the area of a specific portion of the image field.

7. A method in accordance with claim 1 wherein the change, which is detected, in content of the image field scanned is an increase in area of a specific portion of the image field scanned by said sensing means.

8. A method in accordance with claim 1 wherein the image field scanned contains a plurality of particles moving through such field and the information generated by computer analysis of said video signals is operable to define a number of particles moving into and out of the image field scanned during a select period of time.

9. A method in accordance with claim 1 wherein the change in the image field scanned comprises a shift in the location of a specific portion of the image field scanned.

10. A method in accordance with claim 1 wherein the change in the image field scanned comprises a change in dimension of a specific portion of the image field scanned.

11. A method in accordance with claim 1 wherein the detected change in the image field scanned comprises a change in the direction of movement of a specific portion of the field scanned.

12. A method in accordance with claim 1 wherein the detected change in the image field scanned is a change in direction and velocity of a portion of the image field scanned.

13. A method in accordance with claim 1 including programming a computer means to detect a predetermined change in the content of the image field scanned.

14. A method in accordance with claim 13 including programming a computer means to detect one or more of a plurality of predetermined changes in said image field scanned.

15. A method in accordance with claim 1 which includes computer analyzing signals generated in scanning the image field over a period of time and detecting changes in a plurality of variables occuring in the image field over the interval of time during which scanning is effected.

16. A method in accordance with claim 1 wherein said trend in said change in said image content of said image field is determined by generating code signals indicative of said trend and applying said code signals to intelligibly indicate said trend.

17. A method of analyzing a changing condition comprising generating electrical analog signals which are indicative of a changing condition, processing said electrical analog signals by digitizing same and generating digital signals thereof, computer analyzing the digital signals so generated and generating, as a result of such computer analysis, code signals which are indicative of at least one rate of change of said changing condition, and applying said latter code signals to an indicating means so as to indicate the rate of change of said changing condition.

18. A method in accordance with claim 17 which includes employing said latter code signals to control a means for affecting and further changing said changing condition.

19. A method in accordance with claim 18 which includes employing said latter code signals to vary the operation of a servo motor for changing said changing condition.

20. A method in accordance with claim 18 wherein said changing condition is affected by a variation in temperature, said method including employing said latter code signals to affect a change in the temperature of said changing condition to variably change said changing condition.

21. A method in accordance with claim 18 wherein said changing condition is affected by the rate of flow of a fluid, said method including employing said latter generated code signals to vary said fluid rate of flow to affect a change in said changing condition.

22. A method in accordance with claim 21 including recording the digital code signals generated at respective locations of a memory having respective time codes recorded therein, which time codes may be reproduced therefrom with selected information from said memory so as to indicate the times selected variations occured in the image field scanned.

23. A method in accordance with claim 22 wherein the image field scanned contains at least one portion thereof which varies in location in such image field, said method including generating digital code signals which vary in accordance with variations in the location of said selected portions, computer analyzing said digital code signals and generating information signals indicative of the degree of such variation and the location of said selected portion.

24. A method in accordance with claim 23 wherein the image field scanned contains at least one portion thereof which is in rotational motion and generating information signals indicative of the degree of such rotational movement.

25. A method in accordance with claim 23 wherein the portion thereof of the image field scanned is in translation, said method including generating information signals indicative of the degree of said such translation.

26. A method in accordance with claim 23 wherein the image field scanned contains at least one portion which is in rotational and translational motion, said method including generating information signals which are indicative of the degree of rotational and translational movements.

27. A method in accordance with claim 26 wherein the image field scanned contains at least one portion which is contracting in size, said method including generating code signals which are indicative of the rate of contraction thereof.

28. A method in accordance with claim 23 wherein the image field scanned contains at least one portion thereof which is expanding in size, said method including generating code signals which are indicative of the degree of expansion of said portion which is expanding.

29. A method in accordance with claim 23 wherein the image field scanned contains at least one portion which is changing in shape, said method including generating code signals which are indicative of the change in shape of said portion.

30. A method in accordance with claim 23 wherein the image field scanned contains a plurality of portions which are changing in shape, said method including generating a plurality of code signals which are indicative of the change in shape of said plurality of portions and are indicative of the locations of such plurality of portions.

31. A method in accordance with claim 23 wherein the image field scanned contains a plurality of portions thereof which change in shape and position with time, said method including generating code signals which are indicative of the changes in shape and the positions of said plurality of portions of the image field scanned.

32. A method in accordance with claim 23 wherein the image field scanned contains a plurality of portions thereof which change in color, said method including generating a plurality of code signals which are indicative of the changes in color of said plurality of portions.

33. A method in accordance with claim 22 including automatically calculating variations in velocity of the selected portion of the image field scanned with time.

34. A method in accordance with claim 22 including automatically calculating variations in the acceleration of the selected portion of the image field scanned.

35. A method in accordance with claim 22 including automatically calculating the degree of a variation in the selected portion of the image field scanned and generating digital code signals indicative of the variations in said degree.

36. A method of analyzing image information comprising scanning an image field, which changes with time, with an electro-optical scanning means which is operated continuously over the span of time it takes for a detectable change to take place in said image field, and generating on an output of said scanning means an analog signal which varies in amplitude over such timespan and wherein the variations of said analog signal define the varying characteristics of the image field scanned, processing and analyzing the signals generated on the output of said scanning means over said period of time and generating computed information signals which are indicative of quantitative variations in at least certain of the variables which occur in said image field over said period of time.

37. A method in accordance with claim 36 wherein the analysis of the signals generated on the output of the scanning means is operable to generate information signals which are indicative of both quantitative variations in the image field content of the field scanned and time from a starting time.

38. A method in accordance with claim 36 wherein the analysis of the signals generated on the output of the scanning means is operable to generate information signals which are indicative of quantitative variations in the image content of the field scanned and such information signals are in digital code form.

39. A method in accordance with claim 38 wherein digital code signals are generated which are indicative of both variations in the content and increments in time from a start-scanning time.

40. A system for analyzing changing events comprising:
first means for scanning an image field which changes in content with time, wherein said scanning is caused to occur a plurality of times and wherein each scanning results in generating scanning signals which vary in accordance with variations in physical characteristics of the image field scanned,
second means for receiving, processing and analyzing said scanning signals and generating first code signals which are indicative of respective instant values of said physical characteristics of said image field, each time said image field is scanned by said first means,
thrid means for generating second code signals at fixed times with respect to each scanning, each of which second code signals is indicative of the time a scanning takes place by said first means,
fourth means including a computer for receiving said first and second signals, analyzing same and generating information signals which define select changes which occurred in the image field between the plurality of scannings effected by said first means.

41. A system in accordance with claim 40 including memory means for recording at least a portion of the information signals so generated and means for selectively reproducing signals from said memory means.

42. A system in accordance with claim 40 including means responsive to said information signals for effecting a controlled change in the content of the image field scanned.

43. A system in accordance with claim 40 including means for controlling a process relating to the image field scanned and responsive to control signals and means responsive to said information signals generated by said fourth means for generating control signals and applying same to said latter means for effecting control of said process.

* * * * *